United States Patent

[11] 3,607,589

[72] Inventor Joseph F. Schirtzinger
Pasadena, Calif.
[21] Appl. No. 866,405
[22] Filed Aug. 12, 1969
[45] Patented Sept. 21, 1971
[73] Assignee Air Logistics Corporation
Pasadena, Calif.
Continuation-in-part of application Ser. No. 406,350, Oct. 26, 1964, now abandoned.

[54] DELAMINATION RESISTANT LAMINATED STRUCTURE
7 Claims, 8 Drawing Figs.
[52] U.S. Cl. .................................................. 161/55,
161/58, 161/78, 161/86, 161/149
[51] Int. Cl. .................................................... B32b 5/12
[50] Field of Search ........................................... 161/55, 57,
58, 59, 60, 142, 143, 144, 149, 78, 86

[56] References Cited
UNITED STATES PATENTS
1,942,354  1/1934  Collings et al. ............... 161/60
2,126,837  8/1938  Stewart et al. ................. 161/55
2,338,447  1/1944  Lenart et al. .................. 161/60 X
2,631,957  3/1953  Francis, Jr. .................... 156/178
2,834,702  5/1958  Gibb .............................. 161/57
2,977,270  3/1961  Bodle ............................. 161/58
FOREIGN PATENTS
191,739  2/1924  Great Britain ................ 156/118

Primary Examiner—Robert F. Burnett
Assistant Examiner—Raymond O. Linker, Jr.
Attorney—Christie, Parker & Hale ABSTRACT: A laminated structure capable of sustaining local deformations to compound curvature without delamination including a central sheetlike layer of elastomeric material and a plurality of spaced parallel tensile elements bonded to each opposite side of the central layer. The tensile elements are fabricated of a material which, if provided in sheet form, would be susceptible to delamination upon local deformation to compound curvature. The tensile elements have a width parallel to the sheet greater than their thickness normal to the sheet. The tensile elements on one side of the sheet are aligned at a predetermined angle to the length of the tensile elements bonded to the opposite side of the sheet. The elastomeric core of the laminated structure absorbs interlaminar shear between the tensile elements and prevents delamination of the structure when the structure is deformed locally to compound curvature.

INVENTOR.
JOSEPH F. SCHIRTZINGER

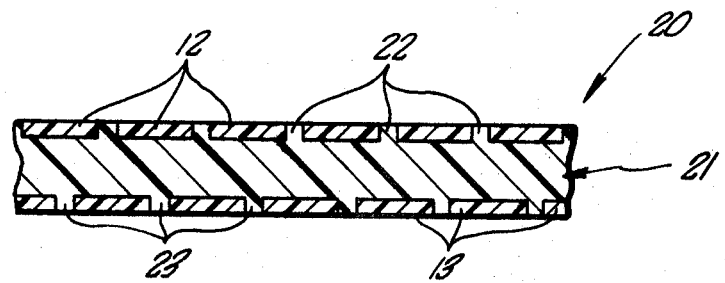
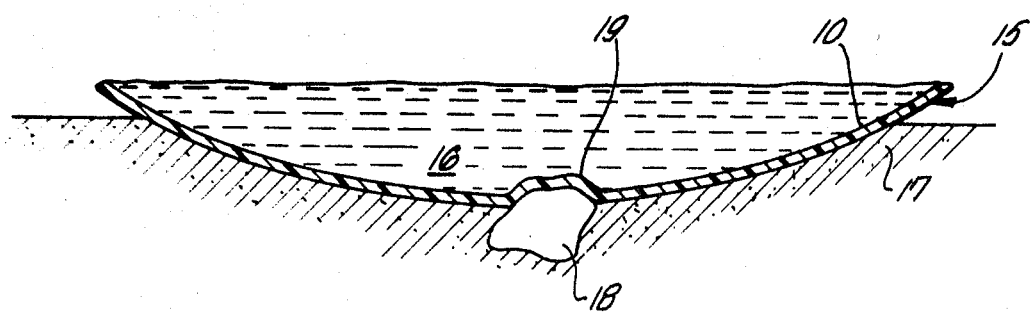
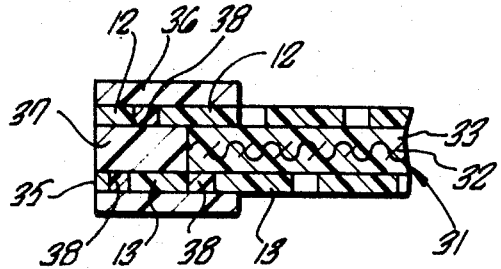
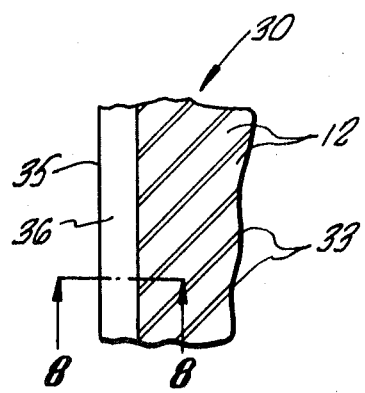
INVENTOR.
JOSEPH F. SCHIRTZINGER
BY
Christie, Parker & Hale
ATTORNEYS.

DELAMINATION RESISTANT LAMINATED STRUCTURE

CROSS-REFERENCE TO RELATED APPLICATION

This application is a continuation-in-part of my copending application, Ser. No. 406,350 filed Oct. 26, 1964 now abandoned.

BACKGROUND OF THE INVENTION

Rigid and semirigid laminated structures are subject to delamination when deformed into a doubly curved condition by the application of a force applied in a direction normal to the interfaces of the laminae. Such deformation produces interlaminar shear forces which act parallel to the lamina interfaces. Delamination is typically produced by the inability of the adhesive used to secure the laminae together to absorb these interlaminar shear forces.

Delamination is to be avoided in laminated structures for several reasons. For example, delamination allows the laminae to work against one another as the structure is repeatedly deformed in response to the application of loads to the structure. Such working reduces the structural integrity of the laminae, especially in resin-bonded fiber glass filament laminae. This is undesirable where such laminae are used to fabricate a fluidtight vessel or the like.

STATEMENT OF THE INVENTION

This invention provides an improved laminated structure which is highly resistive to delamination by interlaminar shear. The elements in the structure may move relative to one another to accommodate interlaminar shear so that the structure is useful in a variety of applications where a strong, lightweight construction highly resistive to interlaminar shear is required.

The laminated structure of this invention includes an elastomeric sheet to the opposite sides of which are bonded first and second pluralities of parallel and uniformly spaced apart, substantially linear, and locally essentially rigid, tensile elements. On each side of the sheet, the elements extend substantially over the entire surface of the sheet and the elements of the first plurality are disposed at an angle greater than 0° relative to the elements of the second plurality. The tensile elements are comprised of essentially parallel resin-bonded glass filaments and have a high ratio of tensile strength to tensile modulus of elasticity.

Each tensile element is a strip having a cross-sectional dimension parallel to the sheet substantially greater than its cross-sectional dimension normal to the sheet. Since the elastomeric sheet absorbs shear loads imposed parallel to its surface, the tensile elements secured to the sheet do not separate from it on imposition of interlaminar shear.

Preferably, the parallel glass filaments of each tensile element are bonded together in a cross ply construction. In such a construction, a layer of side-by-side parallel filaments is cross plied relative to the overlying and underlying layers of side-by-side parallel filaments. Typically, the cross ply is at an angle of about 90°.

The parallel filaments of fiber glass in the tensile elements are untwisted and are bonded together by a hard-setting organic resin such as an epoxide or a phenolic resin. Such a construction has a high ratio of tensile strength to tensile modulus of elasticity (Young's modulus) and exhibits great resilience when subjected to torque and bending. When fabricated as strips having a width substantially greater than the thickness, the strips are locally essentially rigid to lateral, tensile, and compressive loads. Considered, however, with reference to the entire length, the strips can be twisted and bowed much like steel bands.

It will be apparent from the following description that the term "sheet of elastomeric material," in the context of this invention, includes both homogeneous and composite sheets. A homogeneous sheet preferably is provided in the form of a sheet of natural rubber or a synthetic rubber such as silicone-butyl rubber. A composite sheet preferably is provided as a sheet of fabric covered on opposite sides with a layer of material, such as an asphaltic material, which does not set to a hard state in the environment of the structure. Such homogeneous and composite sheets have the common feature that they allow relative movement in directions parallel to the plane of the sheet between elements attached to the same or opposite surfaces of the sheet. In other words, a "sheet of elastomeric material," as the term is used to define this invention, is a sheet of material which absorbs shear loads imposed along the surface(s) thereof.

BRIEF DESCRIPTION OF DRAWINGS

The above-mentioned and other features of this invention are more fully set forth in the following detailed description of presently preferred embodiments of the invention, which description is made in conjunction with the accompanying drawings, wherein:

FIG. 5 is an enlarged fragmentary cross-sectional elevation view of a second preferred embodiment of this invention;

FIG. 6 illustrates the utility of a laminated structure according to this invention;

FIG. 7 is a top plan view of a portion of a third preferred embodiment of this invention showing the edge of the structure; and FIG. 8 is a cross-sectional elevation view taken along line 8—8 of FIG. 7

DETAILED DESCRIPTION OF INVENTION

Figure 1:
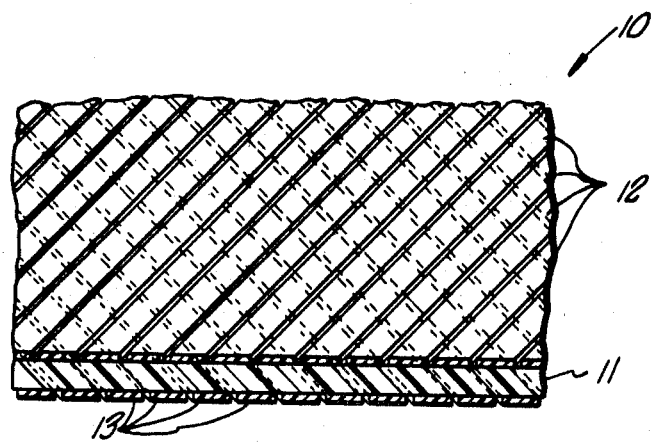
FIG. 1 is a perspective view of a portion of a laminated structure according to this invention.

FIG. 1 shows a laminated structure 10 including a sheet of elastomeric material 11 having elongated linear tensile elements 12 and 13 secured to opposite sides of the sheet. The elements secured to a given side of the sheet, preferably, as shown, are of uniform cross-sectional configuration and are spaced apart at regular intervals while being secured to the sheet in parallel relation in a common plane. It is also preferred that the elements on opposite sides of the sheet be identical. As shown, elements 12 are disposed at a predetermined angle relative to the elongate extents of elements 13. The tensile elements have the construction described above.

Sheet 11 is a body of homogeneous material such as natural or synthetic rubber. The tensile elements are secured to the sheet by a suitable bonding agent. Various adhesive or bonding agents may be used. By way of illustration, the bonding agents may be polymers or copolymers of vinyl acetate and vinyl chloride, chlorinated rubber or rubber-resin compositions, and cellulose esters and ethers, as well as various other thermoplastic resins.

Figure 2:
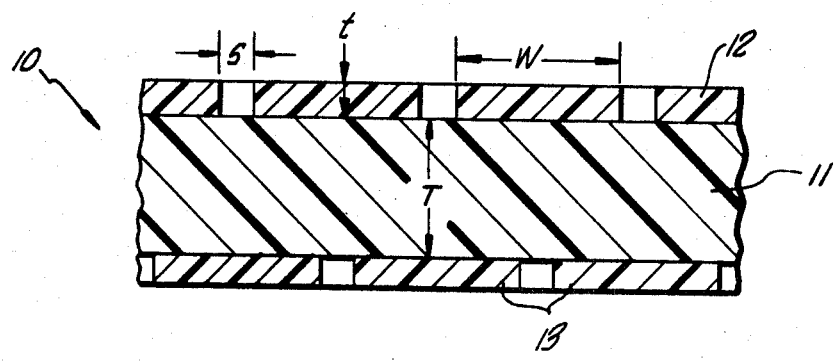
FIG. 2 is an enlarged fragmentary cross-sectional elevation view of the embodiment of the invention shown in FIG. 1.

As shown in FIG. 2, it is desired that the tensile elements on a given side of the sheet of elastomeric material be spaced apart a distance $s$ which is less than the width $w$ of the elements. Also, it is preferred that width $w$ of each element be greater than the thickness $t$ of the element (in the direction through sheet 11) so that each element bends preferentially with the sheet, rather than along the adjacent surface of the sheet, when the structure is deformed.

The width $w$ of each element is related to the anticipated deformation which structure 10 must withstand without showing any delamination effect. This relation can best be understood by reference to FIG. 6 which shows a portion of a submersible transport unit 15 adapted for carrying crude oil 16, for example, resting on the floor 17 of a bay or harbor. Because of its weight, the transport unit sinks into the soft bottom of the harbor and engages a large rock or boulder 18. Such engagement produces a local deformation 19 in the body of the transport unit. If the body of the transport unit were fabricated of a laminated sheet wherein each lamina is rigid and is securely bonded to the adjacent lamina, such a deformation will produce delamination in the deformed area. In structure 10, however, this deformation will not produce delamination because the tensile elements are permitted to move relative to one another by the sheet of elastomeric material. If the expected deformation which the structure is to withstand is great, elements 12, 13 are narrow in proportion to their thickness and sheet 11 is thick (thickness $t$ of the sheet is measured between tensile elements 12,13). If the expected deformation of the structure is low, the elements may be wide in proportion to their thickness and the sheet is thin.

Figure 3:
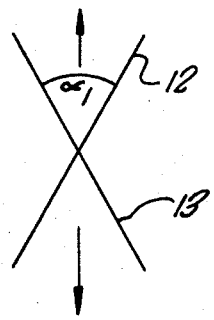
FIGS. 3 and 4 are schematic diagrams showing how the angular relationship between the elements secured to the opposite sides of the sheet of elastomeric material determine the structural characteristics of the structure.
Figure 4:
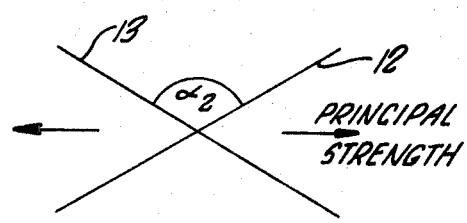

Structure 10 has the feature that its tensile strength in perpendicular directions in the plane of the structure is adjustable. If the included angle $\alpha$ (see FIGS. 3 and 4) between the elongate extents of the elements on the opposite sides of the structure is an acute angle (angle $\alpha$ in FIG. 3), the greatest tensile strength of the structure is in a direction parallel to the bisector of the angle. If the included angle is obtuse (angle $\alpha$ in FIG. 4), the greatest tensile strength of the structure is in a direction normal to the bisector. Accordingly, the structure may be fabricated to produce the greatest strength and the lightest weight possible in any given application of the structure. This feature, in combination with the feature that the structure may be constructed in accord with the greatest deformation it must withstand, provides a structural device which may be tailor made to an optimum for any given situation.

In the foregoing description, the structure has been referred to as planar merely for the purposes of explaining certain features of the invention. It will be understood by those skilled in the art that a structure according to this invention may be fabricated with single or double curvature, if desired.

FIG. 5 shows a laminated structure 20 which includes a plurality of substantially linear elongated tensile elements 12, 13 secured to opposite surfaces of a sheet 21 of elastomeric material. The sheet has ribs 22, 23 which extend into the interstices between elements 12 and 13, respectively, and terminate coplanar with the surfaces of the elements opposite the sheet. Sheet 21 is shown to be a homogeneous body of material, but it will be understood that the sheet may be a composite structure as shown in FIG. 8. Ribs 22,23 are compressible to accommodate movement of the tensile elements toward and away from each other as the structure is deformed. Structure 20 is preferred over structure 10 in many applications, such as marine applications, since the opposite surfaces of the structure are smooth and do not resist the flow of fluids or solids over the structure.

FIGS. 7 and 8 show a laminated structure 30 fabricated of a plurality of tensile elements 12, 13 and an elastomeric sheet 31. The sheet is a composite member which includes a sheet of fabric 32, preferably woven of a synthetic material such as nylon which is resistive to action by hydrocarbons, covered on opposite sides by a layer of material 33, such as asphalt which does not set hard into a rigid state in the environment of the structure.

FIGS. 7 and 8 also illustrate a preferred construction of the structure at an edge 35 thereof. This construction may be used where the structure is to be secured to a foundation or the like. An elongated tensile element 36 (which may itself be a more conventionally fabricated laminated member) is disposed adjacent each side of the structure along edge 35. Preferably, elements 36 are fabricated of the same material as elements 12,13. Elements 36 are secured to elements 12,13, as by bonding, for example. An edge strip 37 is disposed between tensile elements 12,13 and is bonded to the elements to secure their ends relative to one another. The edge strip has a thickness equal to the thickness of sheet 31. This construction provides a "selvedge" along the edge of the laminated structure. The structure may then be bolted to a foundation by passing suitable studs or bolts through the edge construction of the structure. Alternatively, the structure may be bonded to a supporting foundation, if desired.

The edge construction described above is compatible with each of structures 10, 20, and 30. In cases where the laminated structure does not provide ribs of the elastomeric sheet in the interstitial spaces between tensile elements 12,13, as in structures 10 and 30, it is preferred that these spaces immediately adjacent elements 36 be filled with a thermosetting resin 38, such as epoxy or phenolic resin, to provide a secure base for each of elements 36.

There has been described above a novel laminated structure. Proper selection of the dimensions of the tensile elements and of the elastomeric sheet according to the guidelines set forth above produce a laminated structure which may be deformed without delaminating and without taking a permanent set. While the structure has been described with respect to certain compositions and arrangements of structure, this has been merely by way of illustrating and explaining certain presently preferred embodiments of the invention and, except as according to the following claims, are not to be considered as limiting the scope of the invention.

1. A laminated structure comprising an elastomeric sheet, a plurality of parallel and uniformly spaced apart, substantially linear, locally essentially rigid tensile elements comprised of resin-bonded glass filaments secured to one side of the sheet over substantially the entire extent thereof, a second plurality of parallel and uniformly spaced apart similar tensile elements secured to the opposite side of the sheet over substantially the entire extent thereof and disposed at an angle greater than 0° relative to the elements on the one side of the sheet, each tensile element being comprised of a plurality of layers of parallel glass filaments bonded together, the filaments in each layer of tensile element being essentially parallel to each other and disposed in cross ply relation to the filaments in each adjacent layer of the tensile element, the tensile elements having a high ratio of tensile strength to tensile modulus of elasticity, each tensile element being a strip having a cross-sectional dimension parallel to the sheet substantially greater than its cross-sectional dimension normal to the sheet, wherein the tensile elements secured to the sheet do not separate therefrom because of interlaminar shear by reason of the sheet absorbing shear loads imposed parallel to the surface thereof.

2. Structure in accordance with claim 1 wherein the cross ply is 90°.

3. Structure in accordance with claim 1 wherein the elastomeric sheet is a substantially homogeneous body.

4. A laminated structure capable of sustaining local deformation to compound curvature without delamination comprising a sheet like layer of an elastomeric material, a plurality of parallel and uniformly spaced apart substantially linear tensile elements secured to one side of the sheet over substantially the entire extent thereof, a second plurality of parallel and uniformly spaced apart substantially linear tensile elements secured to the opposite side of the sheet over substantially the entire extent thereof, the tensile elements being locally essentially rigid and fabricated of fiberglass filaments bonded together by an organic resin in a cross ply construction and having a high ratio of tensile strength to tensile modulus of elasticity, the filaments of each tensile element being arranged in layers with the filaments in each layer being essentially parallel to each other and disposed in a cross ply relation to the filaments in the adjacent layers of the tensile element, each tensile element being a strip having a width parallel to the sheet substantially greater than the thickness thereof in a direction normal to the sheet, the elastomeric material defining ribs which extend into and fill the spaces between the tensile elements in said pluralities and terminate coplanar with the surfaces of the elements opposite from the sheet, wherein the tensile elements secured to the sheet do not separate therefrom because of interlaminar shear by reason of the sheet absorbing shear loads imposed parallel to the surface thereof.

5. Structure in accordance with claim 4 wherein the spacing between adjacent tensile elements in each plurality is less then the width of the elements.

6. Structure according to claim 4 wherein the elastomeric sheet has an edge to which the tensile elements extend, and a pair of elongated tensile elements similar to the elements in said pluralities disposed along the edge on opposite sides of the sheet in overlying relation to the adjacent elements in said pluralities and secured to said adjacent elements.

7. Structure according to claim 6 including an edge member having a thickness equal to the thickness of the elastomeric sheet and bonded to the sheet along said edge, the tensile elements in said pluralities extending to the limit of the edge member opposite from the elastomeric sheet and being bonded thereto, and wherein the members of said pair of elongated tensile elements are disposed in overlying relation to the edge member with the tensile elements of the pluralities disposed between them and the edge member.

PO-1050
(5/69)

UNITED STATES PATENT OFFICE
CERTIFICATE OF CORRECTION

Patent No. 3,607,589      Dated Sept. 21, 1971

Inventor(s) Joseph F. Schirtzinger

It is certified that error appears in the above-identified patent and that said Letters Patent are hereby corrected as shown below:

At Col. 3, line 23 should read "(angle $\alpha_2$ "

instead of "(angle $\alpha$in ", after the word "obtuse".

Signed and sealed this 11th day of July 1972.

(SEAL)
Attest:

EDWARD M. FLETCHER, JR.      ROBERT GOTTSCHALK
Attesting Officer      Commissioner of Patents